United States Patent [19]

Lambert

[11] 4,190,333
[45] Feb. 26, 1980

[54] SPECTACLE FRAMES

[75] Inventor: Raymond E. Lambert, North Attleboro, Mass.

[73] Assignee: Lambert Anodizing Co. Inc., Attleboro, Mass.

[21] Appl. No.: 869,636

[22] Filed: Jan. 16, 1978

[51] Int. Cl.$^2$ .................. G02C 1/08; G02C 5/14; G02C 5/22; G02C 5/12
[52] U.S. Cl. .................. 351/95; 16/128 A; 351/121; 351/153; 351/138; 351/131
[58] Field of Search .................. 351/83, 90, 153, 138, 351/121, 95, 96, 140, 132, 131, 80; 16/128 A

[56] References Cited
U.S. PATENT DOCUMENTS

| | | | |
|---|---|---|---|
| 2,614,459 | 10/1952 | Ditto | 351/90 |
| 2,682,196 | 6/1954 | Baldanza | 351/83 |
| 2,727,436 | 12/1955 | Prince | 351/98 |
| 2,868,073 | 1/1959 | Rosen et al. | 351/52 |
| 3,016,797 | 1/1962 | Liautaud | 351/94 |
| 3,345,121 | 10/1967 | DeAngelis | 351/130 |
| 3,391,976 | 7/1968 | Lindbloom | 351/130 |
| 3,758,203 | 9/1973 | Lipchik et al. | 351/132 |
| 3,801,189 | 4/1974 | Bolle | 351/52 |
| 3,941,461 | 3/1976 | Lambert | 351/95 |

*Primary Examiner*—John K. Corbin
*Assistant Examiner*—Rodney B. Bovernick
*Attorney, Agent, or Firm*—John A. Haug

[57] ABSTRACT

A metallic spectacle frame having each of its eyes split to accomodate a lens is provided with hinge assemblies each of which including a T-bar member that extends through the frame to the front side thereof. The portion of the T-bar member disposed on the front side of the frame forms a plaque which adds structural support to the frame as well as conceals the slit in the frame. The plaque extends around the side of the frame and abuts against a temple. A slot formed in the bridge of the frame is adapted to receive a nose pad assembly which is retained by a set screw extending into the frame from the back side thereof. A pair of notches are formed adjacent the slot to receive respective posts of the nose pad assembly to ensure proper orientation of the assembly. The nose pad assembly may comprise a rocker arm with individual nose pads, a single piece saddle bridge or some variant thereof.

14 Claims, 8 Drawing Figures

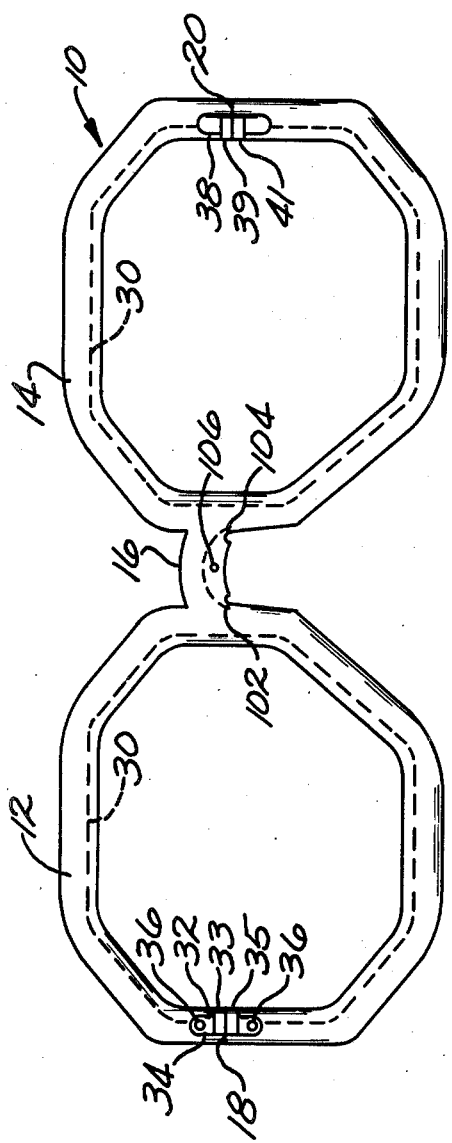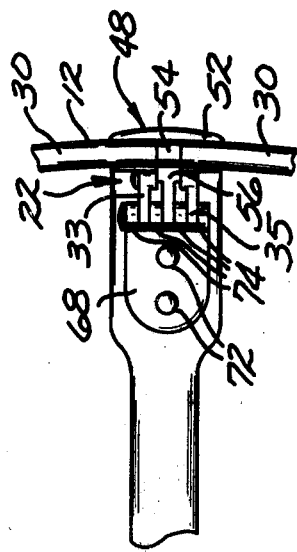

SPECTACLE FRAMES

BACKGROUND OF INVENTION

This invention relates to spectacles and more particularly to metallic frame spectacles.

Metal frames have long been in use and still offer many advantages over frames made of plastic. Plastic frames for instance have various limitations including the fact that they are subject to degradation with age and concomitant cracking, they tend to lose their shape, particularly when subjected to elevated temperatures and there are fewer options for design variations with such frames. On the other hand, metal frames have several characteristics which must be dealt with to make them suitable for use. Means must be provided so that the frame fits comfortably on the wearer's nose. Since metal is a good thermal conductor the frame would feel uncomfortable in temperature extremes, hot or cold, so a nose pad assembly having a surface formed of thermal insulating material should be provided to interface between the frame and the wearer. Another problem posed by metallic frames relates to the fact that since the eye wire is split in order to accomodate a lens the frame is weakened in the vicinity of the slit and is subject to twisting movement and possible chipping or breaking of the lens. Additionally, the slit detracts from the aesthetic appeal of the frames.

These problems can be handled to some extent when the metal employed for the frames is conducive to conventional soldering techniques, such as nickel silver frames. With regard to the aesthetic detraction of the slit a cosmetic plaque can be soldered to the eye wire above or below the slit and extend over the slit area to thereby conceal it; however, the frame is still in a weakened condition due to the slit. In respect to the nose pad assembly, metal posts mounting suitable plastic pads can be soldered directly to the bridge area of the frame.

However, many frames are composed of material such as aluminum, which is not readily solderable. From a market standpoint acceptance of such frames has been limited due to the inability of prior art approaches to deal with these problems even though frames made of aluminum or the like offer other advantages such as lightness in weight, high strength and design versatility, that is, the frame can be provided with many different finishes and colors.

SUMMARY OF INVENTION

It is therefore an object of the invention to provide a metal spectacle frame which is both aesthetically pleasing and strong, one which is not subject to lens cracking or breaking due to torsional movement of portions of the eye wire contiguous to the slit. Another object is the provision of a metal spectacle frame having an improved nose pad assembly to enhance the fit of the glasses for the wearer. Yet another object is the provision of metal spectacle frames which are readily adaptable to accomodate different physical features of the wearer as well as one which can easily be repaired or its aesthetic impression changed. Other objects and features will be in part apparent and in part pointed out hereinafter.

Briefly, a spectacle frame embodying the invention employs a T-bar member as part of a seven barrel hinge assembly. The T-bar extends through the frame and terminates with a plaque disposed on the front of the frame above and below the slit in the eye wire and is firmly held thereagainst to both conceal the slit and to provide structural rigidity to that portion of the frame. The plaque is shown with a surface extending around the side of the frame concealing the side view of the slit and abutting against its respective temple. The bridge portion of the frame is provided with a slot extending therein from the bottom surface and communicating with a notch at opposite extremities of the slot. A flat plate is received in the slot and is retained therein by a set screw extending through a bore in the back of the frame. Two posts project from the plate and extend through respective notches to properly orient the plate. The posts mount at their other end conventional nose pads, saddle bridge or some variant thereof.

BRIEF DESCRIPTION OF DRAWINGS

FIG. 1 is a rear elevational view of a frame on which two barrel hinge members have been mounted and slit, along with their respective eye wires, to provide access for lens members and showing a slot in the bridge portion for reception of a bridge assembly portion;

FIG. 2 is a side elevation of a portion of the frame and one of the temples showing the improved hinged structure of the invention;

DESCRIPTION OF PREFERRED EMBODIMENTS

Figure 3:
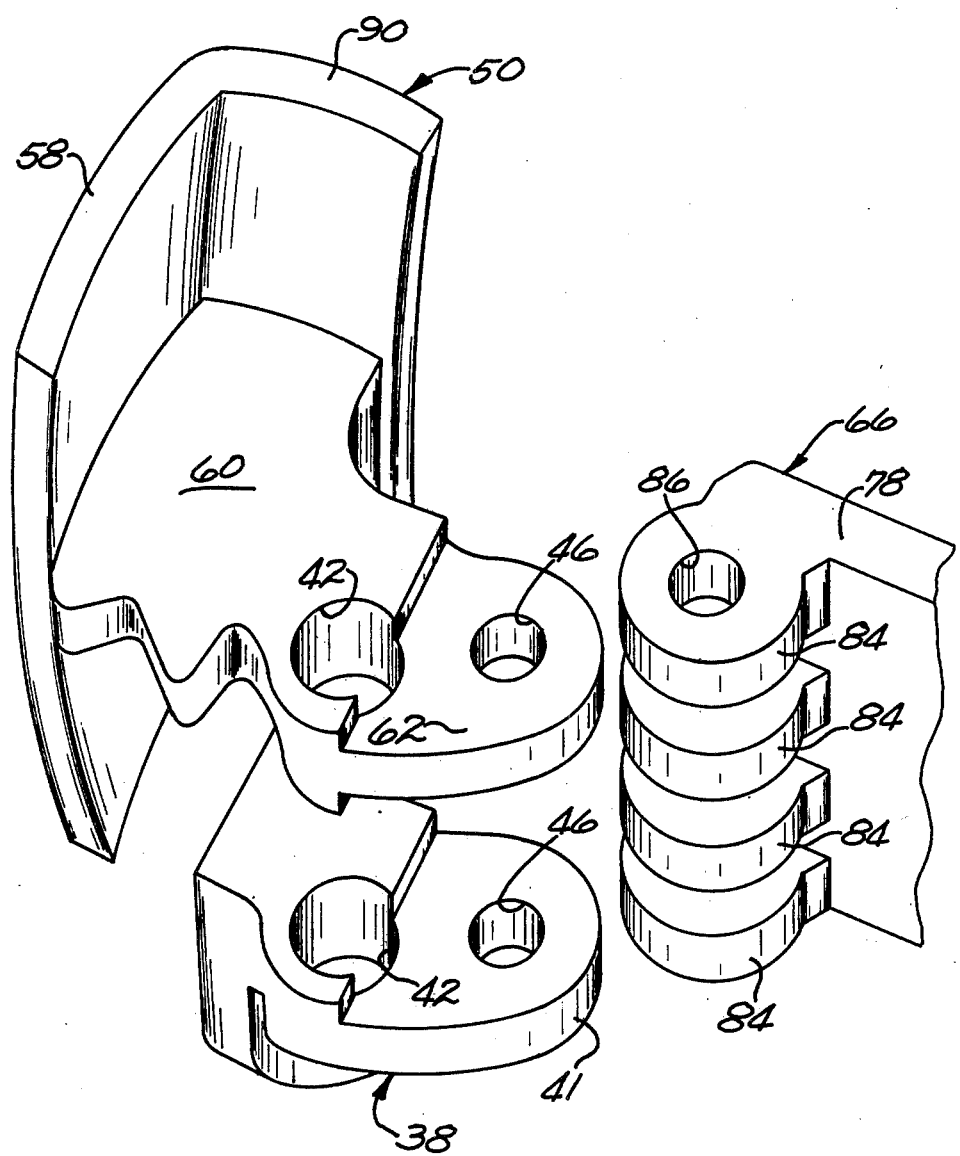
FIG. 3 is a perspective of a hinge assembly comprising a T-bar plaque member along with the bottom half of a previously slit two barrel hinge member and a broken away portion of a four barrel temple hinge. The assembly also includes the top half of the two barrel hinge member which is not shown in the Figure for the purpose of clarity of illustration.

Referring now to the drawings numeral 10 designates a pair of spectacle frames shown without temples or a nose pad assembly. Frame 10 comprises a main body portion having first and second eye wires 12 and 14 joined by bridge portion 16. Although any suitable material can be used for the main body portion, aluminum is preferred because of its lightness of weight, excellent mechanical strength and the flexibility it offers by way of design finishes. Eye wires 12 and 14 are slit at 18 and 20 respectively so that a lens can be inserted therein. Respective hinge assemblies are provided at each outer lateral or temple side of the eye wires 12 and 14 which serve to clamp the lens as well as to mount temples as will be explained in more detail below. A lens groove 30 is formed in each eye wire to receive the outer periphery of a lens. A standard two barrel hinge part 32 having an upper barrel 33 and a lower barrel 35 is received in a recessed portion 34 in the back of eye wire 12 and attached thereto using conventional flush rivets 36. That is, the heads of rivets 36 are flush with the front side of eye wire 12. After hinge part 32 is attached to eye wire 12 and a similar hinge part 38 having an upper barrel 39 and a lower barrel 41 is attached to eye wire 14, slits 18 and 20 are formed, as by sawing, through the eye wires and hinge parts.

Figure 5:
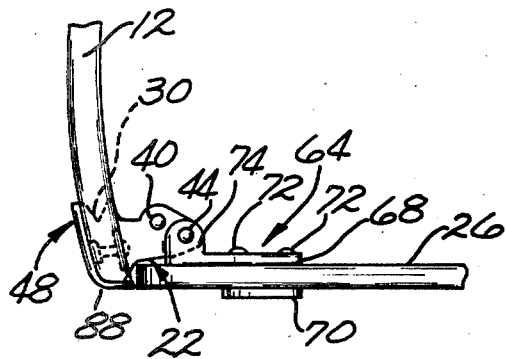
FIG. 5 is a top plan view of a hinge assembly and a portion of the associated frame and temple.
Figure 6:
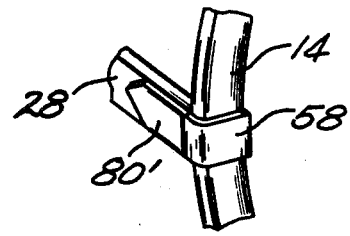
FIG. 6 is a perspective view of a front and side plaque and a portion of the associated frame and temple.
Figure 7:
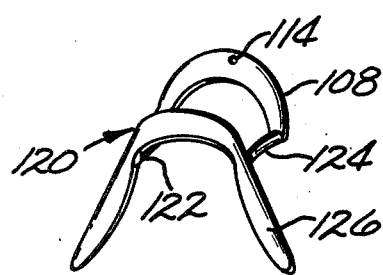
FIGS. 7 and 8 are perspective views of two types of nose pad assemblies useful with spectacles made in accordance with the invention.

Hinge parts 32 and 38, see FIGS. 3 and 5, are each formed with a first, inner bore 40, 42 respectively and a second, outer or temple hinge bore 44, 46 respectively.

The use of a three barrel hinge part interdigitated with two barrel slit hinges to form hinge assemblies is conventional practice. However, as mentioned above, this procedure has certain limitations. Slitting of the frame not only detracts from the aesthetic appeal of the frames it also weakens it and makes it more likely that strain forces will be transmitted to the lens ultimately causing chipping or breakage thereof. This problem is exacerbated as the frame receives more and more use since the rivet holes gradually become enlarged and permit more relative motion of the various parts of the frame.

Pursuant to the present invention, these limitations are overcome by means of T-bar members 48 and 50 forming part of respective hinge assemblies 22 and 24. As seen in FIGS. 2 and 5, T-bar member 48 includes a plaque portion 52 and a shank portion 54 extending therefrom having a free end portion forming barrel 56 matching barrels 33 and 35 of hinge part 32. Barrel 56 is provided with bores 40 and 44 aligned with like bores in barrels 33 and 35. T-bar member 50 is formed in the same way with a plaque portion 48, shank 60 and barrel 62 extending therefrom with bores 42, 46 aligned with like bores in barrels 39, 41 of hinge part 38.

After eye wires 12 and 14 and hinge pieces 32, 38 are split T-bar members 48, 50 are each inserted through its respective slit 18, 20 in the frame so that the back of the plaque is contiguous to the front of the eye wire. Screws are dropped into the inner bores 40, 42 and partly driven in.

The other half of the hinge assemblies comprise four barrel temple hinge parts 64, 66 respectively. Again with reference to FIGS. 2 and 5, temple hinge part 64 comprises a base 68 through which a pair of bores extend. Temple plaque 70 as seen in FIG. 5 is provided with a pair of projections 72 which extend through bores formed in temple 26 and are received in the bores in base 68 and are headed over to securely mount hinge part 64 to its temple. It will be appreciated that separate flush rivets could be used with hinge part 64 if it is not desired to provide a temple plaque. Four spaced barrels 74 extend from base 68 and are provided with a bore extending through the barrels. Barrels 74 of hinge part 64 are interdigitated with barrels 33, 35 and 56 and a temple screw is inserted and driven in to securely fasten temple 26 to eye wire 12.

Figure 4:
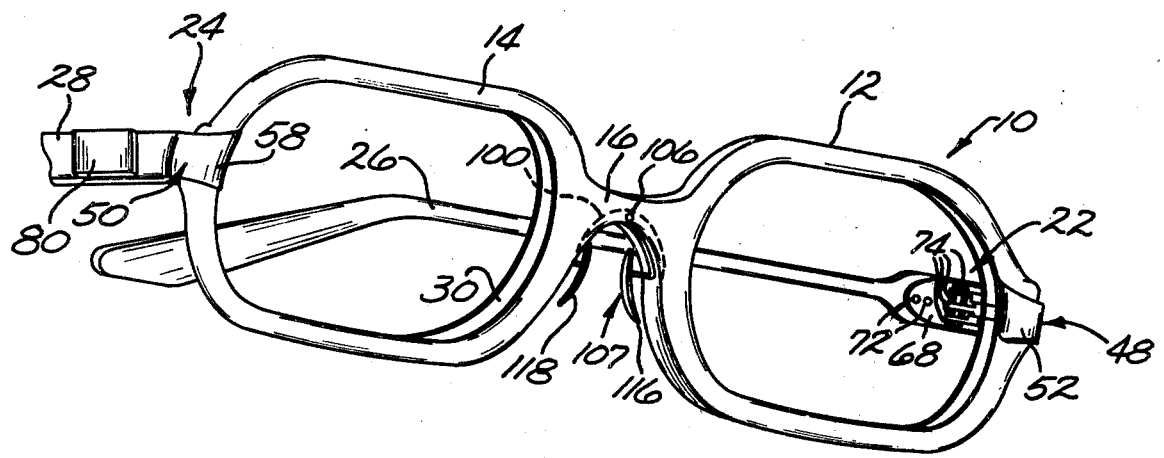
FIG. 4 is a perspective view of a pair of spectacles showing both the improved hinge structure and a nose pad assembly mounted in the bridge portion of the frame.

In like manner, with reference to FIGS. 1, 3 and 4, temple hinge part 66 having a base 78 is attached to temple 28 in conjunction with temple plaque 80. Spaced barrels 84 extending from base 78 have a bore 86 therethrough to receive a temple screw after the barrels are interdigitated with barrels 39, 41 of hinge part 38 attached to eye wire 14 and 62 of T-bar member 50.

After a lens is inserted in its respective seat and the screws in the inner bores 40, 42 are tightened it will be securely and rigidly held in place due to the extra strength provided by the seven barrel hinge and particularly the T-bar configuration of members 48, 50. Plaques 52, 58 are held fast against the front of the frame both above and below the slits and markedly increase the rigidity and strength of the connection. In addition, the slit is masked so that it does not detract from the aesthetics of the design. It will be noted that the plaques may be formed with respective surfaces 88, 90 which extend around the side of the frame so that the slit of the eye wire is also masked as seen from the side. Surfaces 88, 90 advantageously extend to a point where they abut against respective temples or temple plaques as desired.

Figure 8:
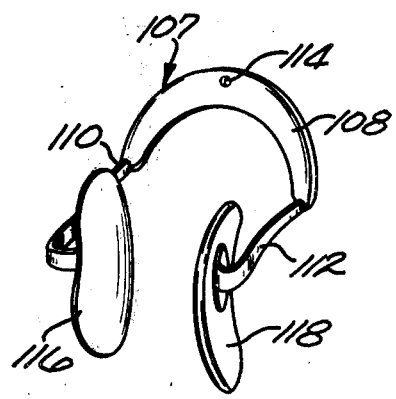

Turning now to another feature of the invention a slot 100 is formed in bridge portion 16 communicating with the lower surface thereof. Respective notches 102, 104 (FIG. 1) are formed in the bridge in communication with slot 100 at opposite extremities thereof. A small threaded bore 106 is formed in the back side of bridge portion 16 also in communication with slot 100. A nose pad assembly 107 (FIGS. 4 and 8) may be mounted in slot 100 and comprises a flat plate 108 of readily solderable material shaped to conform to slot 100 and received in the slot with legs 110, 112 extending from the plate, as by soldering thereto, through respective notches 102, 104 to properly orient plate 108 in the slot. A set screw is received in bore 106 and extends into a bore 114 in plate 108 to lock the plate in slot 100. Legs 110, 112 have free distal end portions which mount respective nose pads 116, 118.

Alternatively a different type of nose pad assembly 120 comprising a unitary saddle bridge may be mounted in slot 100. Assembly 120 includes plate 108 with legs 122, 124 extending from opposite sides and having a free distal end joined to a molded saddle bridge 126. It will be understood that it is within the purview of the invention to provide other types of nose pad structures mounted on plate 108, as desired.

The above nose pad feature permits ready interchange of one type or size of nose pad assembly for another so that the structure most suitable for a particular user can be utilized without having to store otherwise duplicate frames. Further, the above feature also permits cosmetic changes. For instance, the color scheme of the spectacles can be readily coordinated with designs of the T-bar plaques and temple plaques. If one desires to change the visual or aesthetic effect of the spectacle frames, T-bar members having other colors or designs on their plaques may readily be substituted as may nose pad assemblies.

Various changes and modifications in the above described embodiments will be readily apparent to those skilled in the art and any of such changes or modifications are deemed to be within the spirit and scope of the present invention as set forth in the appended claims.

I claim:

1. A spectacle frame comprises a main body portion having a front, sides and back and having two eye wires joined by a bridge portion, a slit formed in each eye wire so that a lens can be inserted and clamped therein, an upper barrel attached to each eye wire above the slit and a lower barrel attached to each eye wire below the slit and two T-bar members each having an elongated barrel projecting from a front plaque, the elongated barrel extending through a respective slit with the plaque disposed contiguous to the eye wire above and below the slit on the front side of the main body portion, the upper, lower and elongated barrels being aligned and having a bore extending therethrough, fastening means extending through the bore in the barrels to clamp the eye wires and T-bar members together and temple means attached to the frame.

2. A spectacle frame according to claim 1 in which the plaque is formed with a surface extending from the front around the side of the frame.

3. A spectacle frame according to claim 1 in which the upper, lower and elongated barrels are also formed with a temple hinge bore therethrough.

4. A spectacle frame according to claim 3 in which the temple means includes a temple and four barrels attached thereto, the four barrels being interdigitated with the upper, lower and elongated barrels.

5. A spectacle frame according to claim 4 including a temple plaque attached to the four barrels with the temple disposed therebetween.

6. A spectacle frame according to claim 2 in which the temple means includes a temple and the plaque abuts against an end of the temple.

7. A spectacle frame according to claim 2 in which the temple means includes a temple and a temple plaque attached thereto and the T-bar plaque abuts against an end of the temple plaque.

8. A spectacle frame according to claim 1 in which the upper, lower and elongated barrels have second bores extending therethrough, the temple means including a plurality of barrels having a bore extending therethrough, the upper, lower and elongated bores interdigitated with the plurality of barrels and fastening means extending through the second bores and the bores in the plurality of barrels.

9. Eyeglass frame apparatus comprising a main body portion having first and second lens defining eye wires joined by a bridge portion, each eye wire having an outer lateral portion and an inner lateral portion, the inner lateral portion being adjacent the bridge portion, the outer lateral portion separated into an upper and a lower eye wire by means of a slit formed therethrough to allow reception of a lens within the eye wire, a front hinge member having at least one barrel projecting from a base mounted on each of the upper and lower eye wires, a hinge member formed in the shape of a T-bar configuration having a plaque portion joined to a depending barrel portion, the hinge member disposed between the said at least one barrels in the upper and the lower eye frames with the plaque portion located in front of the eye wire and extending through the slit, apertures formed in the barrels and aligned so that a fastening element extending through the apertures will maintain the plaque against the front of the eye wire.

10. A spectacle frame comprising a main body portion having a front, back and sides and having two eye wires joined by a bridge portion and temple means attached to the eye wires, the bridge portion having a top and a bottom surface, a slot formed in the bridge portion in communication with the bottom surface, two notches formed in the back side of the bridge portion in communication with the bottom surface and the slot, a bore in the back side of the bridge portion in communication with the slot, a plate member configured to be received in the slot, the plate disposed in the slot and provided with first and second legs extending from the plate and being disposed in the respective notches, the legs having free distal ends, and nose pad means mounted on free distal ends of the legs, and a fastening means received in the bore to secure the plate in the slot.

11. A spectacle frame according to claim 10 in which a bore is formed in the plate aligned with the bore in the back side of the bridge portion and the fastening means extends into the bore in the plate.

12. A spectacle frame according to claim 10 in which the two notches are formed at opposite extremities of the slot.

13. A spectacle frame according to claim 10 in which separate nose pads are mounted on the free distal ends of the legs.

14. A spectacle frame according to claim 10 in which a unitary saddle bridge is mounted on the free distal ends of the legs.

* * * * *